July 14, 1953

C. W. SPOHR 2,645,396

APPARATUS FOR FILLING BAGS

Filed March 12, 1946

Inventor
Carl W. Spohr
By:-
Louis Robertson
Atty.

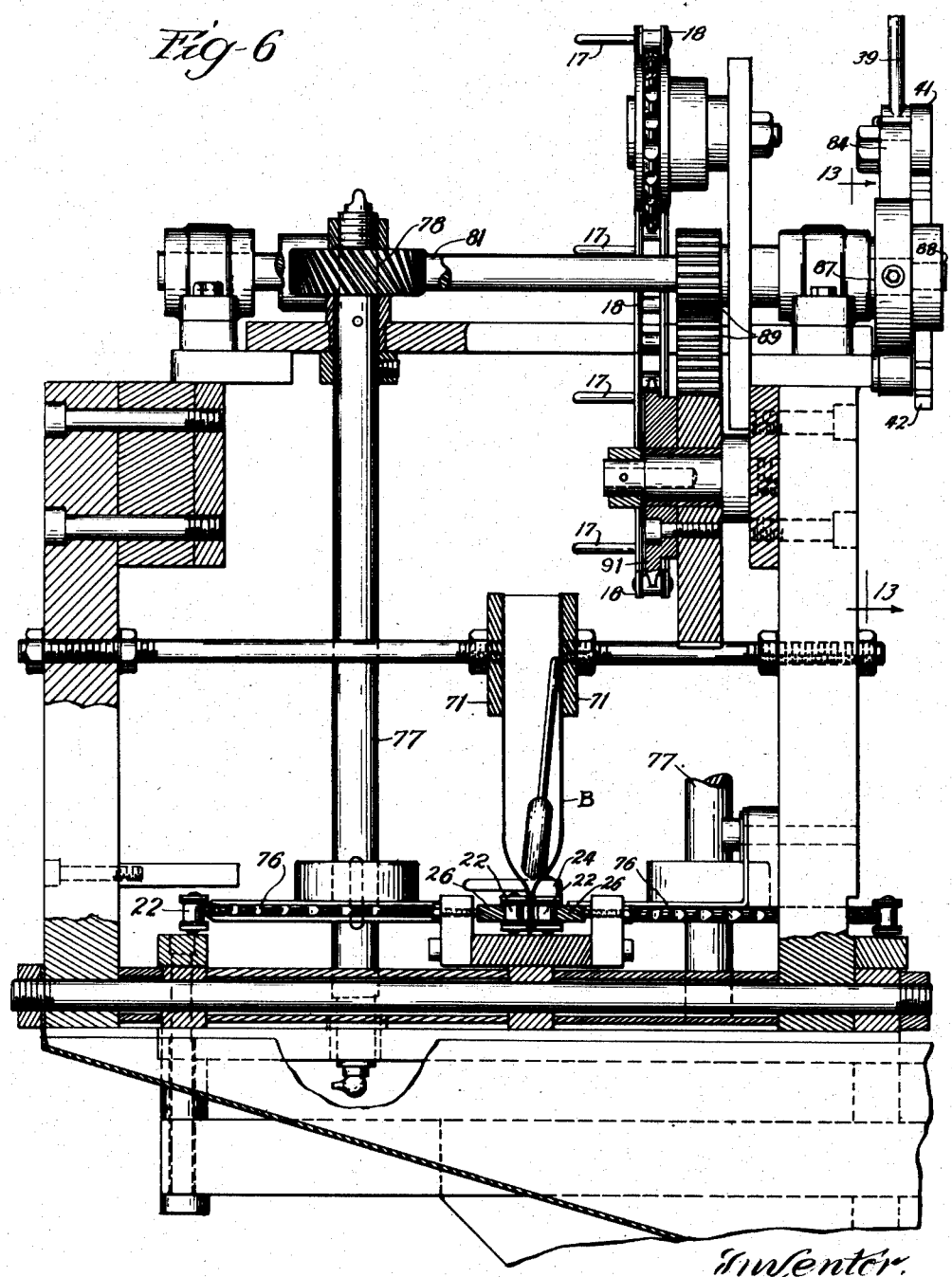

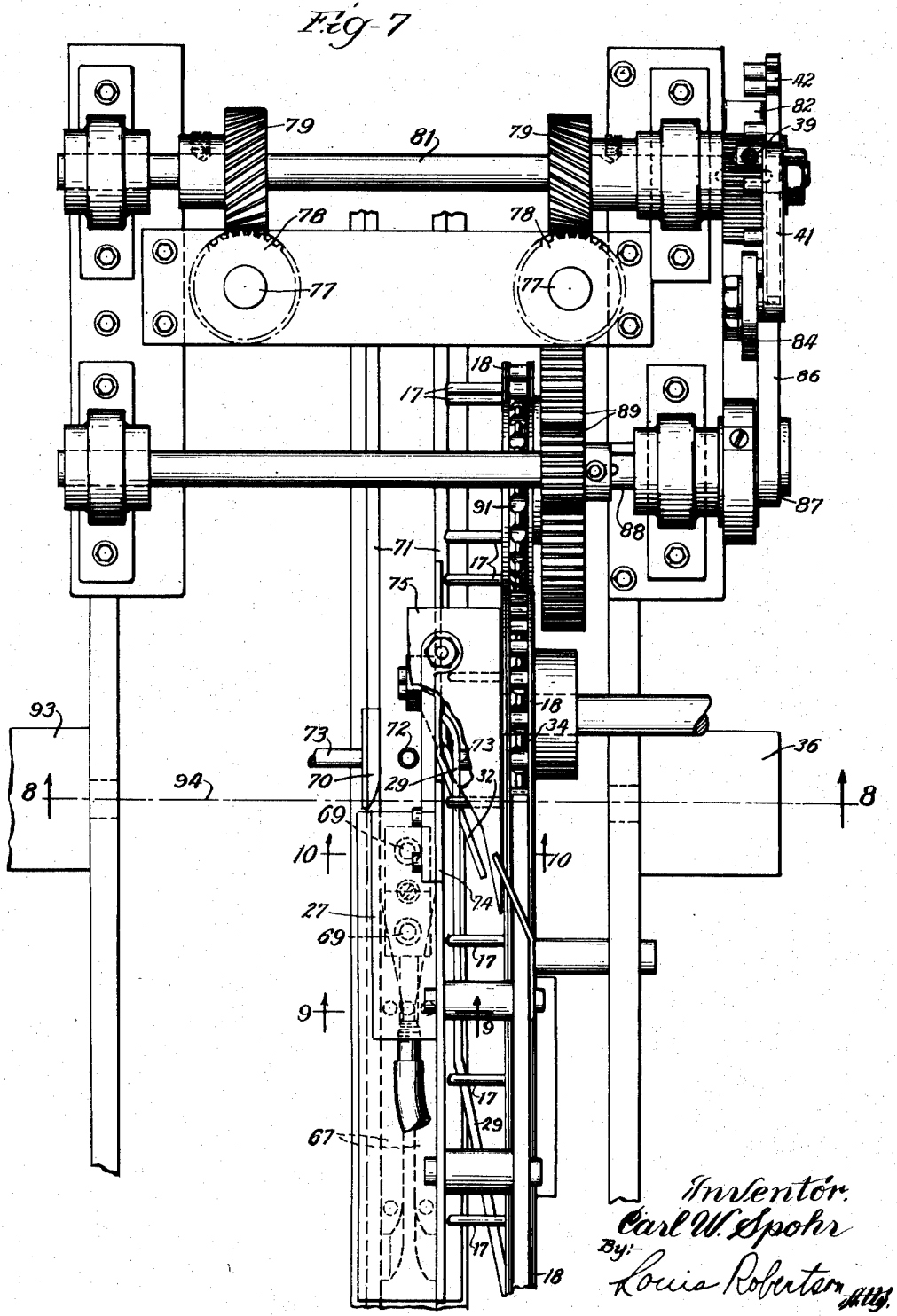

July 14, 1953   C. W. SPOHR   2,645,396
APPARATUS FOR FILLING BAGS
Filed March 12, 1946   9 Sheets-Sheet 8
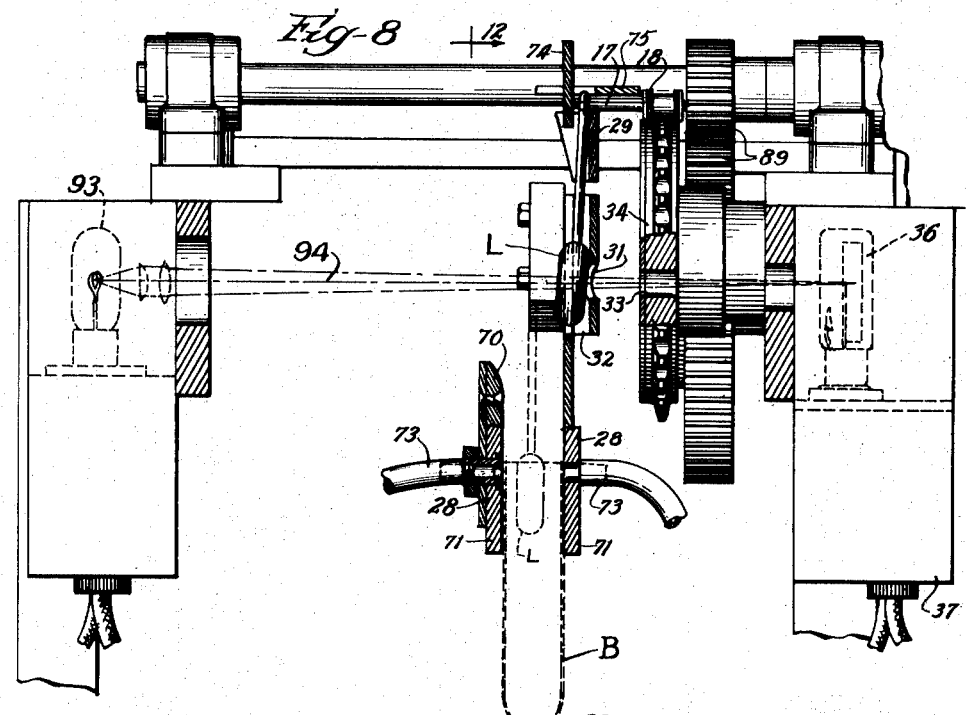
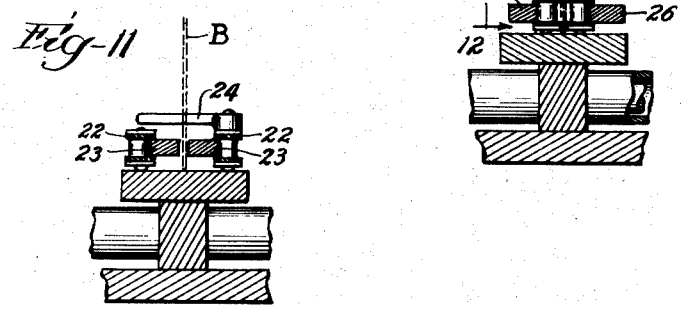
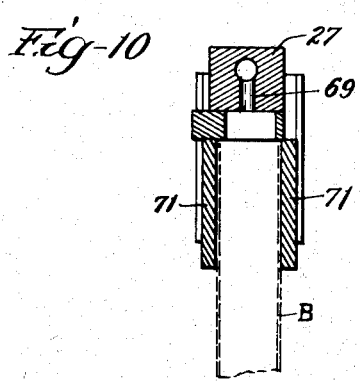
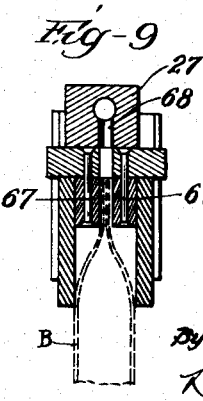
Inventor.
Carl W. Spohr
By:- Louis Robertson
Atty.

July 14, 1953  C. W. SPOHR  2,645,396
APPARATUS FOR FILLING BAGS
Filed March 12, 1946  9 Sheets-Sheet 9

Inventor
Carl W. Spohr
By: Louis Robertson
Atty.

Patented July 14, 1953

2,645,396

UNITED STATES PATENT OFFICE 2,645,396

APPARATUS FOR FILLING BAGS

Carl W. Spohr, Chicago, Ill., assignor to The Curtiss Candy Company, Chicago, Ill., a corporation of Illinois Application March 12, 1946, Serial No. 653,724

10 Claims. (Cl. 226—2)

Lollipops having handles formed of looped string have proved very popular. The looped string has the especially important advantage that it does not present a hazard in the hands of a small child. Children have been seriously injured by falling on sticks of the prior lollipops. In my previous Patent No. 2,278,574, I have disclosed a machine for automatically manufacturing these loop-handled lollipops. In prior Patent No. 2,284,928 I have disclosed a machine for automatically taking the lollipops from their molds and hanging them on a cooling conveyor, each lollipop hanging from a horizontal pin. According to the present invention, the lollipops are automatically taken from the cooling conveyor and packaged, each lollipop being inserted into a tubular shaped bag which is then sealed.

In the preferred form of the invention, two packaging machines are positioned one over the other so that an attendant can attend to both of them at once and the lollipops from a single cooling chain are divided between the two packaging machines so that the entire output of one cooling chain moving at relatively high speed can be handled by packaging machinery running at half that speed.

Not only are the bags filled automatically, but, if a lollipop is missing when it should be dropped into a bag, that fact is indicated and the bag is not advanced until a lollipop is supplied.

Additional objects and advantages of the invention will be apparent from the following description and from the drawings in which:

Fig. 6 is a vertical, sectional view through the bag filling portion of the machine, being taken approximately on the line 6—6 of Fig. 1;

Fig. 7 is a top view of the bag-filling portion and associated parts, being taken approximately on the line 7—7 of Fig. 1;

Fig. 8 is a vertical, sectional view showing particularly the electric eye mechanism and is taken approximately on the line 8—8 of Fig. 7;

Fig. 9 is a fragmentary, vertical, sectional view taken approximately on the line 9—9 of Fig. 7 for showing the initial part of the device for blowing the bags open;

Fig. 10 is a view corresponding to Fig. 9 but showing a later part of the blow-open device, being taken approximately on the line 10—10 of Fig. 7;

Fig. 11 is a fragmentary, sectional view taken approximately on the line 11—11 of Fig. 1;

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General operation

Figure 2:
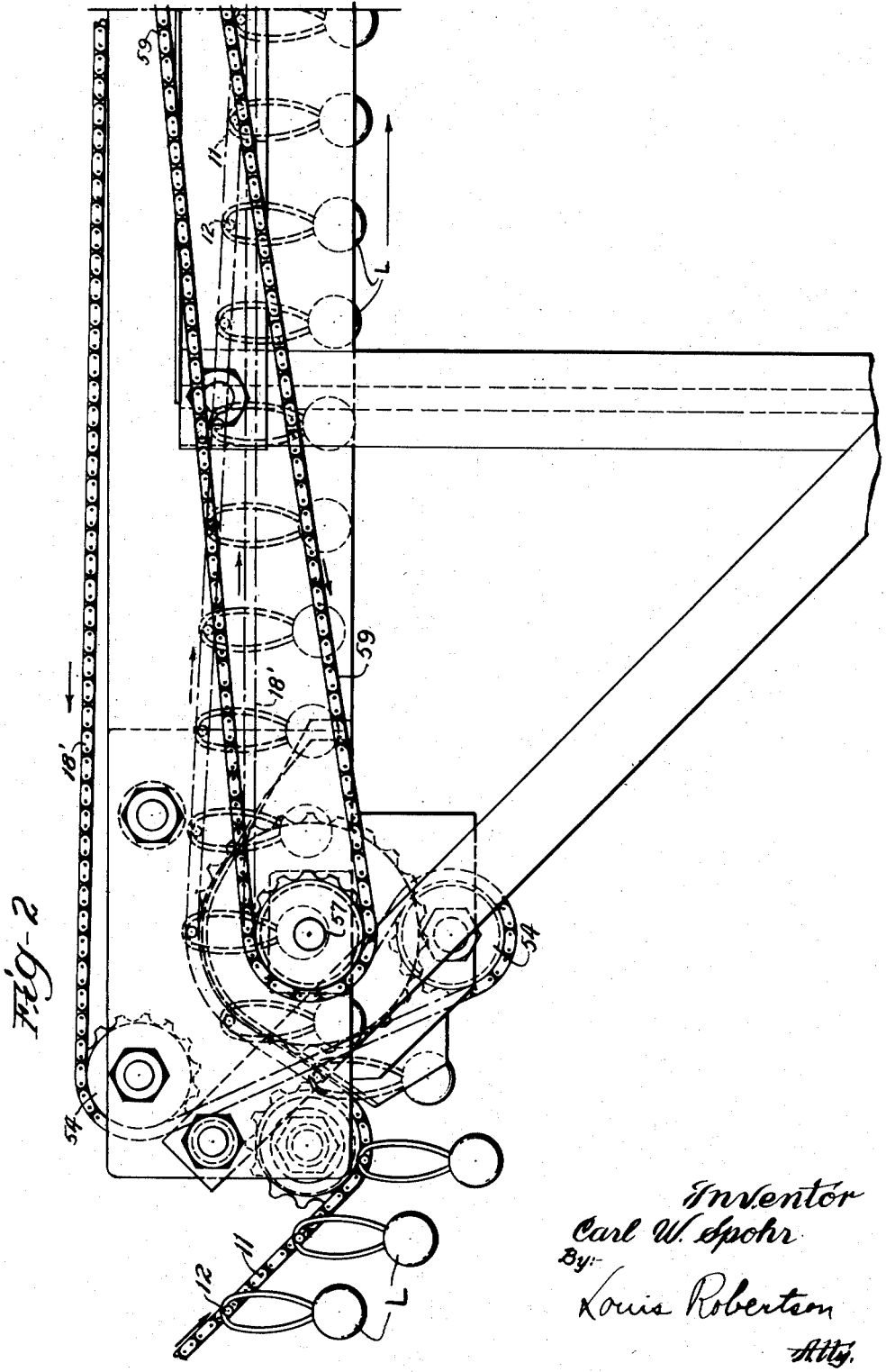
Figs. 2 and 3 are, respectively, side and top views of the portion of the machine indicated at the right-hand end of Fig. 1, these views being taken as from the far side of the Fig. 1 structure so that the lollipops move from left to right, instead of from right to left as in Fig. 1.

The loop-handled lollipops are supplied to the machine of this invention by a cooling chain 11. As seen best in Fig. 3, this chain has a series of headed pins 12 from each of which, automatically, one lollipop L will hang as seen in Fig. 2.

Figure 1:
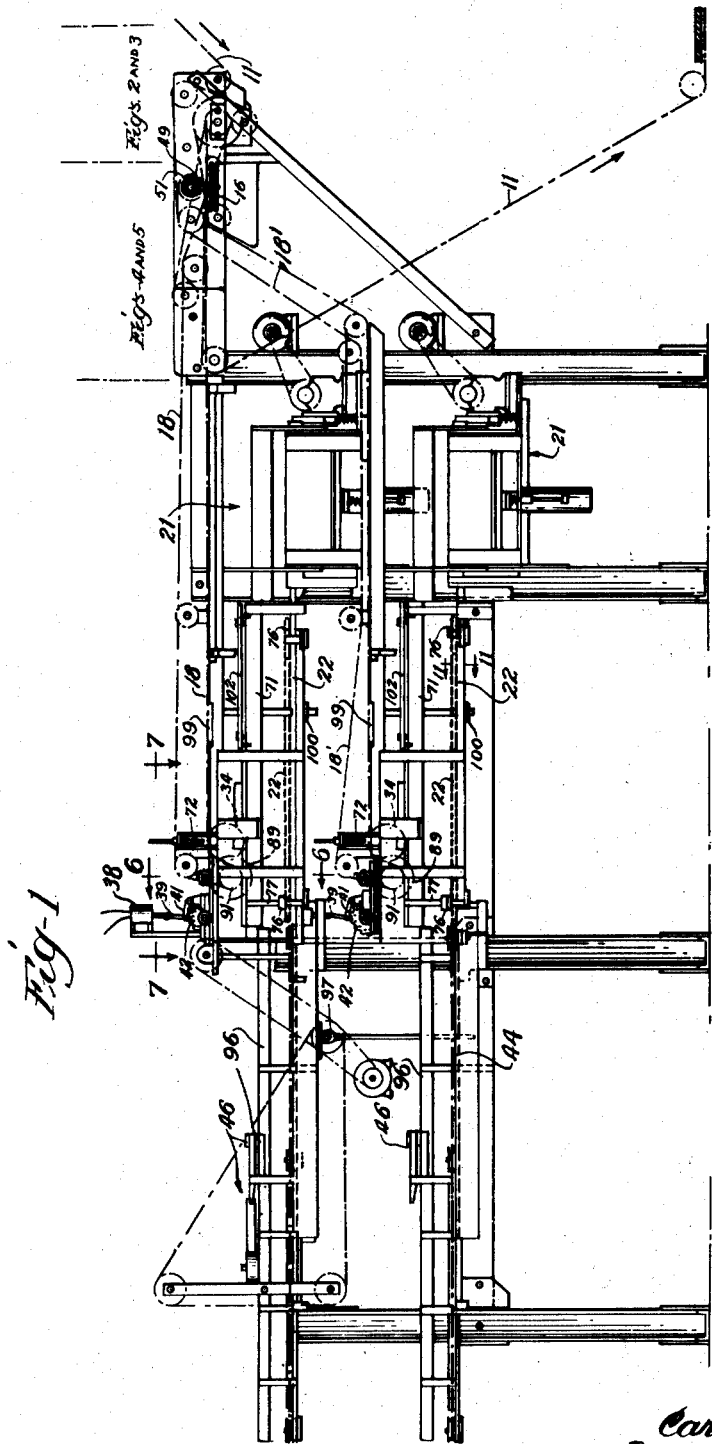
Figure 1 is a side view of the apparatus chosen for illustration of the invention.
Figure 3:
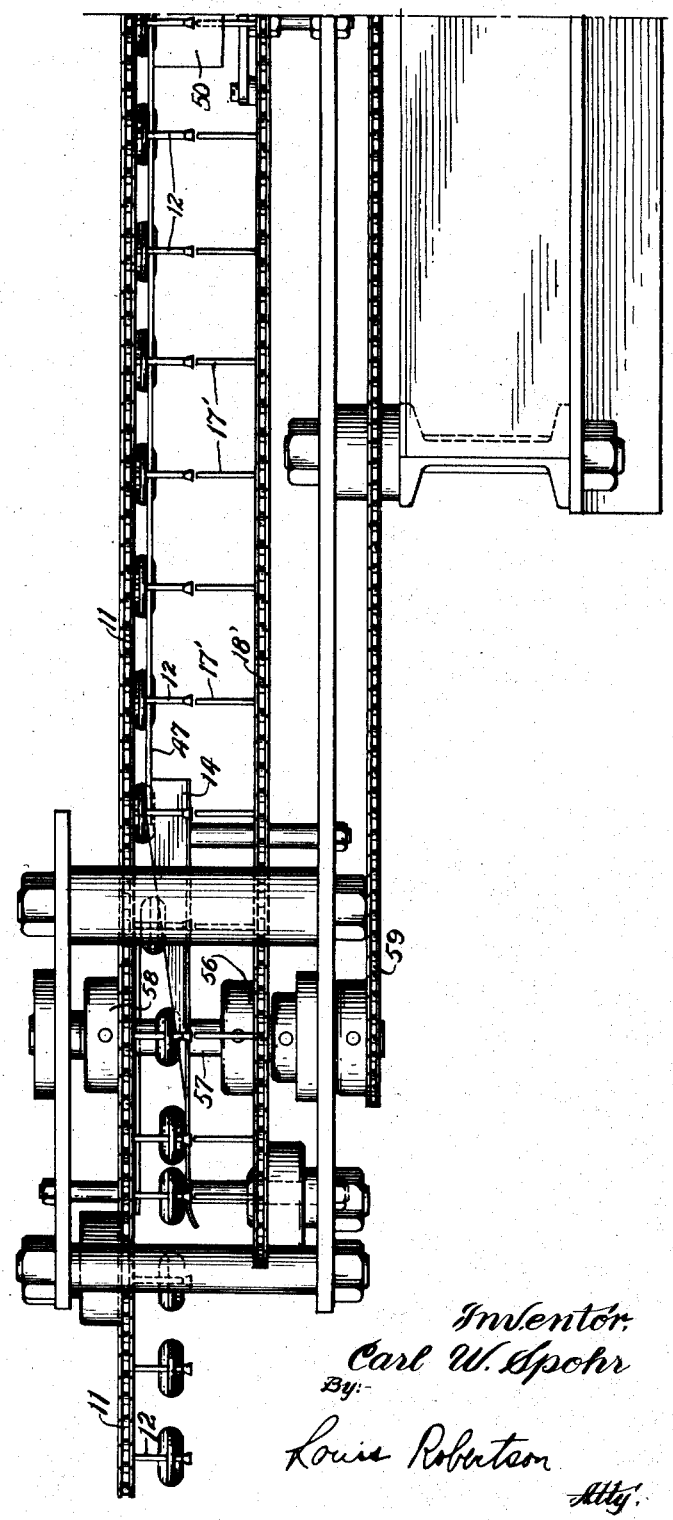
Figure 4:
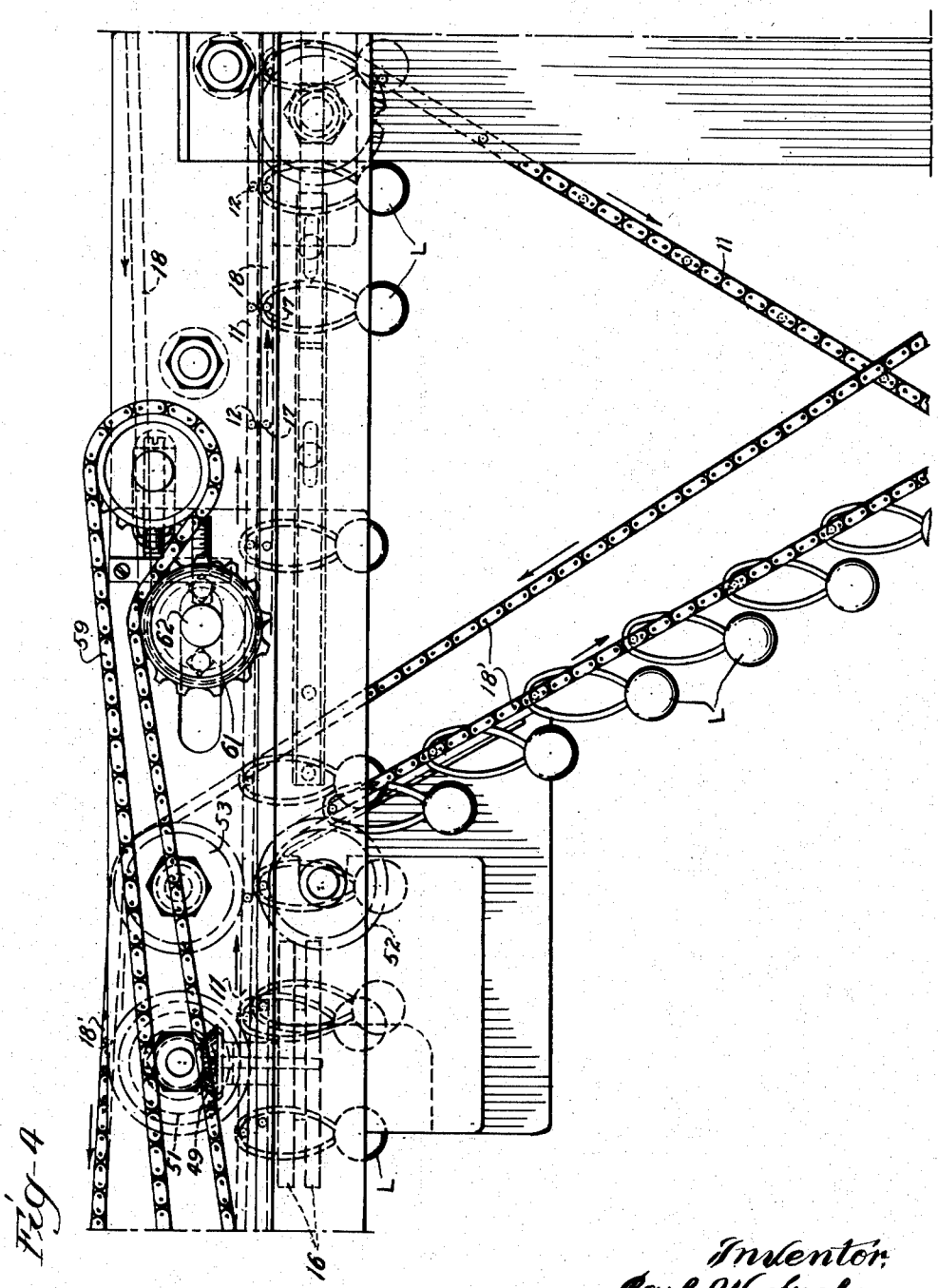
Figs. 4 and 5 are views corresponding to Figs. 2 and 3 but showing the next portion of the structure of Fig. 1.
Figure 5:
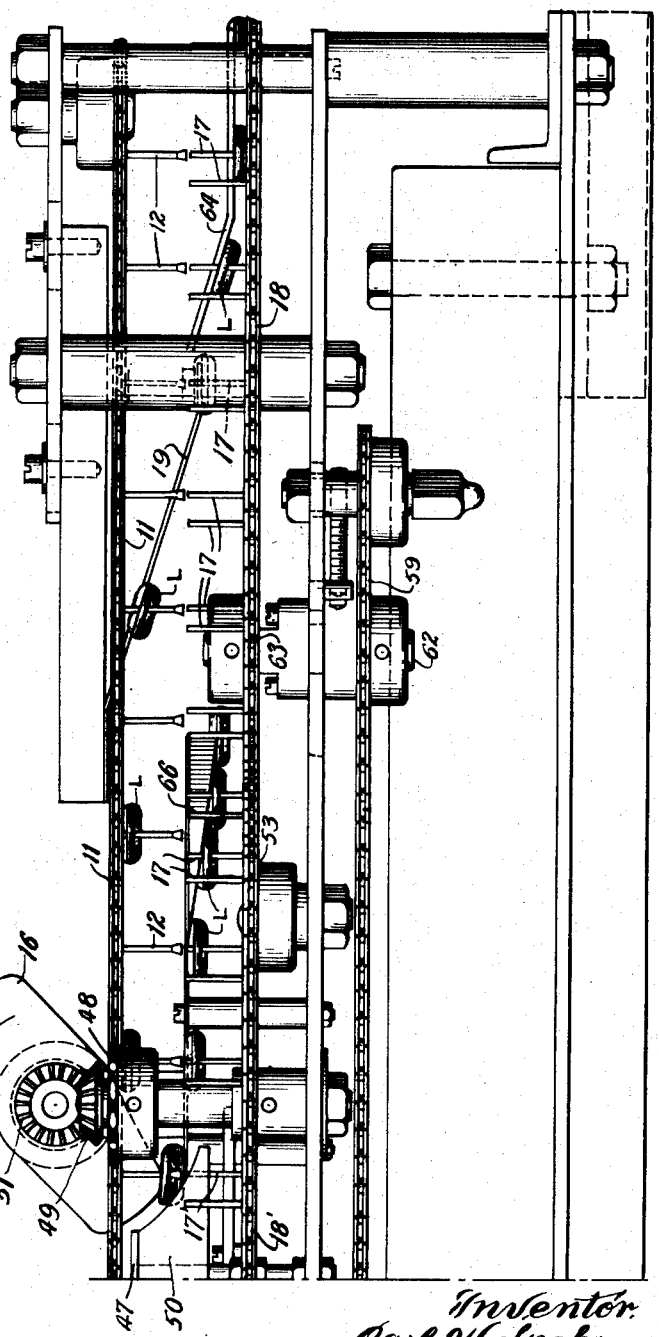

As seen in Fig. 3, a stationary cam 14 slides all of the lollipops along the pins 12 to a position adjacent the chain 11. As seen in Fig. 5, a rotary pusher 16 then pushes alternate lollipops off of pins 12 onto pins 17' carried by a receiving chain or conveyor 18'. The remaining lollipops are carried by chain 11 against a stationary cam 19 which pushes the lollipops onto pins 17 carried by a second receiving chain 18. As seen in Figs. 1 and 4, the chain 18' carries its lollipops downwardly while the chain 18 carries its lollipops horizontally. One leads to the lower packaging apparatus and the other leads to the upper packaging apparatus. The two packaging machines together, one above the other, are able to handle the entire output from a fairly fast-moving cooling chain 11. Because of the relative positions of the machines, one attendant can easily attend to both of them.

Bags are fed by bag feeders 21 to the bite between the horizontal opposed chains 22. The feeding units are adequately described in my copending application, Ser. No. 643,014, now Patent No. 2,556,989, and need not be described in detail here, the disclosure of said application being incorporated herein by reference. For present purposes it is sufficient to note that the bags B in Fig. 11 are blown between suitable guides including guides 23 until they come to rest against stop fingers 24 carried by one of the chains. While the bags are held against the moving stop fingers 24 by the pressure of a jet of air, the chains 22 are brought into engagement with the lower ends of the bags. The inward course of the chains is controlled by chain guides 26 as seen in Fig. 8.

The bags are carried by chain 22 under a blowing head 27 which is provided with a plurality of ports arranged for blowing the bag open.

While each bag is held open by suction heads 28 on the opposite sides thereof (Fig. 8) and by a blast of air from a nozzle 72 (Fig. 12), a lollipop is dropped into the bag by being pushed off of its pin 17 by stationary cam plate 29.

Figure 13:
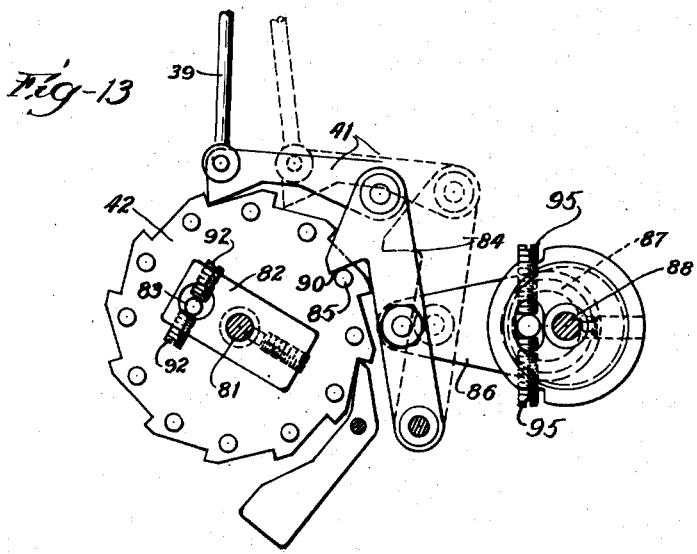
Fig. 13 is a fragmentary, sectional view taken approximately on the line 13—13 of Fig. 6 and showing the mechanism controlled by the electric eye for controlling the feed of the bags.

The chains 22 are normally driven in timed relation to the chain 18 so that a bag will be advanced to receiving position for each time a pin 17 reaches position. Occasionally, however, there is no lollipop on a particular pin 17. According to the present invention, the empty bag intended to receive the lollipop is held in place until a pin 17 carrying a lollipop comes along. This is accomplished with the aid of an electric eye mechanism seen in Fig. 8. When the beam of the eye passes through a hole 31 in guide plate 32 and a hole 33 in sprocket 34, it strikes the photo electric or light-sensitive tube 36 and operates amplifier 37 to actuate a solenoid 38 in Fig. 1. The solenoid raises a link 39 which, as best seen in Fig. 13, raises pawl 41 so that it will not drive ratchet wheel 42. The ratchet wheel 42 is geared to the bag feed chains 22 and, when it is not driven, the bags are not advanced.

As the bags leave the chains 22 they pass between belts 44 which carry the bags so that their upper portions pass between the heated rolls of a "Doughboy" sealer 46.

*Lollipop transfer unit*

After the lollipops are pushed close to chain 11 by stationary cam 14, they are held there by guide 47 until reaching the first transfer position.

The transfer of lollipops from the cooling conveyor 11 to the receiving conveyors 18' and 18 is shown in Fig. 5. The cooling conveyor 11 passes under and engages a sprocket 48 which turns a bevel 49 which engages and turns a second bevel gear 51. This drives a rotary pusher 16 so that it makes one revolution for each four of the pins 12 which pass it. The relative position of the pins with respect to the ends of the pusher 16 are such that each end of pusher 16, as it approaches pins 17' engages the handle of a lollipop and pushes it off of the pin 12 onto a pin 17', premature release from pins 12 being prevented by guide plate 50. The next lollipop passes the pusher 16 untouched. In other words, the pusher engages every alternate lollipop and pushes it onto the receiving conveyor 18'.

The chain 18' moves at half of the speed of the chain 11 and hence it receives a lollipop on each of its pins 17' although it receives only half of the lollipops from the chain 11. To facilitate the transfer, the pins 17' are positioned at a level slightly lower than the pins 12. The relative timing is such that a fast-moving pin 12 catches up with the slower-moving pin 17' just as they reach the position at which the transfer occurs. The chain 18' is then led over a sprocket 52 from which it extends down to the lower packaging machine. The return run of the chain 18' extends over a sprocket 53, around idler sprockets 54, and then around sprocket 56 which is fast on shaft 57 which is also fast to a sprocket 58. The sprocket 56 is half the size of the sprocket 58 thereby assuring that chain 18' moves at half the speed of chain 11 and keeps in a predetermined timed relationship therewith.

Either the chain 11 or the chain 18' may be driven at any point. It may be assumed that the chain 11 is driven at a point not shown and that it drives chain 18' through shaft 57.

Shaft 57 also drives a chain 59 as seen best in Fig. 3. As seen in Figs. 4 and 5, a chain 59 drives a sprocket 61 which through shaft 62 drives a sprocket 63 around which receiving conveyor chain 18 runs. Thus the chain 18 is driven at the same speed as the chain 18' which is half the speed of the cooling conveyor 11.

As chain 11 and 18 move past stationary cam 19, seen in Fig. 5, the cam engages the handles of the lollipops and slides them from pins 12 onto pins 17 which, at the moment of transfer, will be spaced slightly below the pins 12. In order that vibrations or swinging of the lollipops will not cause them to slide off of the pins 17, a further stationary cam 64 may be provided for sliding the lollipops close to the chain 18. In like manner, it may be noted that a stationary cam 66 also slides the lollipops hanging from pins 17' close to chain 18'.

*Bag filling*

Lollipops on chains 18 and 18' are handled in the same way, one packaging machine being below the other. Hence, it will be sufficient to describe the operations and structure with respect to chain 18 and the upper packaging machine.

By the bag feeding apparatus disclosed in my co-pending application, Ser. No. 643,014, now Patent No. 2,556,989, an endless succession of bags B is fed between guides 23 (Fig. 11) which may be flared at their receiving end to facilitate entry of the bags. As a matter of convenience 12 bags may be fed at a time, being secured to a common bag set. These 12 bags may be called a bag set. Each bag set is pressed against a stop or registration finger 24 carried by one of the chains 22 so that as the chains come together to grip the bag set between them, the bag set's position, with respect to the chain, will be accurately predetermined so that each bag will come to rest at the bag-filling position.

Before reaching the bag-filling position, the bag passes under air blast nozzles for opening the bag. Initially, the top of the bag is closely confined by guides 67 so that the jet of air from orifice 68 is directed with adequate strength into the mouth of the bag so as to bulge its sides as seen in Fig. 9. As seen in Fig. 7, the receiving end of the guides 67 is flared to facilitate entry of the bag mouth between them. After the bag is past jet 68, it passes out from the narrow guides 67 and comes under orifices 69 in a zone where the bag lies between more widely spaced guides 71. Here the mouth of the bag is blown open to a width appropriate for receiving the lollipops.

At the lollipop receiving position the bag comes under the influence of a blast of air from nozzle 72 and also, its sides are subjected to suction from suction hoses 73 (Fig. 8). This suction is preferably applied at the very top of the bag to prevent the downward blast from folding the edge inwardly. Thus the bag is reliably held open for receiving the lollipops as they are dropped into the bags, the lollipops being guided by a flared guide 70.

Figure 12:
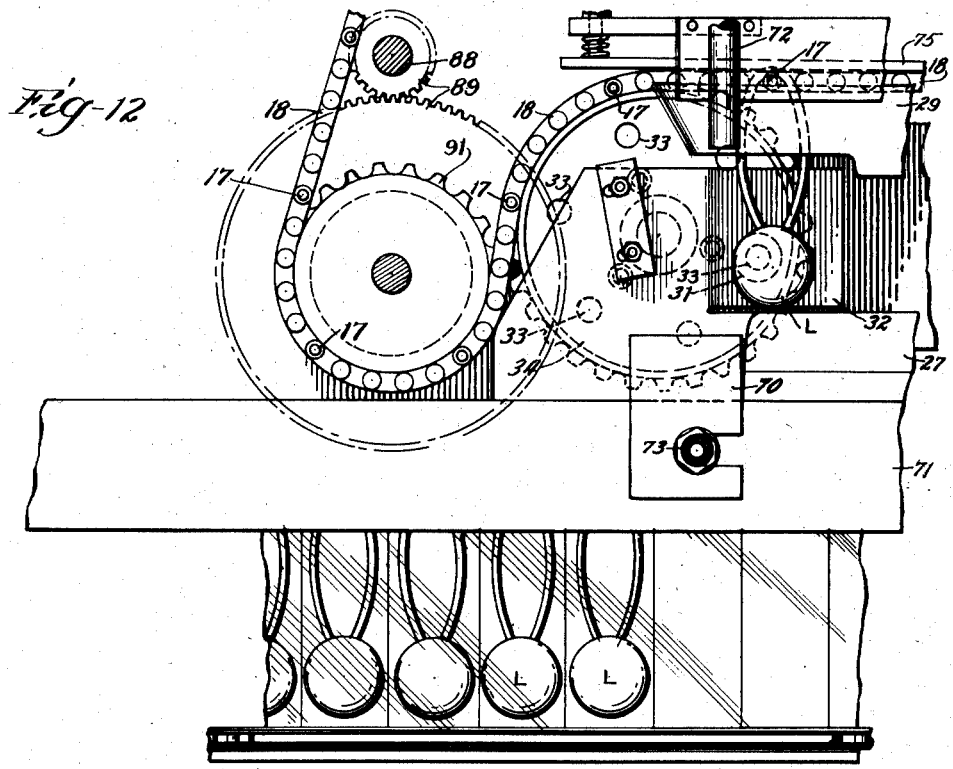
Fig. 12 is a longitudinal, vertical, sectional view taken approximately on the line 12—12 of Fig. 8.

The lollipops are dropped into the bags by being pushed nearly off of the pins 17 by stationary cam 29. Before they are pushed off, the body of the lollipop will have been guided to an appropriate position by guide plate 32. A restraining plate 74 may be positioned to prevent the lollipops from slipping off of the pins 17 too soon. A cam plate 75 (Fig. 7) is preferably loosely suspended as seen in Fig. 12 to rest mainly on the pin 17 from which the lollipop is being pushed to engage the lollipop handle above the pins, this being the most reliable point for the final push off to control the position of final release.

Drive of bag conveyor

As seen best in Fig. 6, the chains 22 are driven by sprockets 76 carried by shaft 77. The shafts 77 are driven by worm wheels 78 which, as seen best in Fig. 7, are driven by worms 79 on shaft 81. As seen in Fig. 13, the shaft 81 is fast on plate 82 which is driven by ratchet wheel 42 through a pin 83 carried by ratchet wheel 42. The ratchet wheel 42 is driven by pawl 41 which is reciprocated by pivoted link 84 which in turn is reciprocated by eccentric link 86 and eccentric 87. The eccentric 87 is carried by shaft 88 which, as seen in Fig. 12, is driven by gears 89 which in turn are driven by sprocket 91 which is driven by chain 18 extending around it.

Since chain 18 is the lollipop conveyor chain, it follows that the bag conveyor chains 22 must have predetermined relationship to the lollipop on chain 18. The gears are such that as the chain 18 moves the distance between its pins 17 the pawl 41 will make one complete stroke including active stroke and return stroke thus moving the ratchet wheel 42 through an angle equivalent to one tooth thereof. Each such movement of the ratchet wheel 42 will move the chains 22 at a distance equal to the spacing between the centers of the bags so as to present a new bag to the receiving position. The exact position at which the bag comes to rest can be determined by adjusting screws 92, as seen in Fig. 13, which adjusts the position of plate 82 with respect to ratchet wheel 42. Stop lugs 85 on ratchet wheel 42 engage a shoulder 90 on link 84 to prevent overrunning of ratchet wheel 42. Timing of the bag movements is accomplished by adjustment screws 95 which change the angularity of eccentric 87 on shaft 88.

Electric eye

It is desirable not to advance the bags unless the bag at the receiving position has been filled. If the lollipop candy is not fed into the lollipop machine steadily, there will occasionally be a pin 17 which has no lollipop hanging therefrom. The purpose of the electric eye shown in Fig. 8 is to detect this fact and prevent the advancing of the bags until a lollipop arrives to be dropped into the bag waiting in the receiving position.

A light bulb 93, through a suitable lense system, projects a beam of light 94 toward photosensitive tube 36. Except at the instant when a lollipop is due in the position shown in Fig. 8, this beam is cut off by sprocket 34.

As seen in Fig. 12, the sprocket 34 has a number of apertures 33 therein, one of which appears in the position shown in Fig. 8 each time that a pin 17 reaches the position shown in Fig. 8. If no lollipop hangs from the pin 17, the beam of light will pass through aperture 33 and strike photocell 36. When the lollipop is present, it substantially cuts off this beam so that the photocell 36 is not actuated. Accordingly, during most of the time, when the operation is normal, there is no operation of the photoelectric equipment by the electric beam.

When, due to the absence of a lollipop, the light beam strikes a photocell 36, it actuates amplifier 37 to cause energization of the solenoid 38 in Fig. 1. This solenoid raises the link 39 in Fig. 13 holding the pawl 41 out of engagement with the teeth of ratchet wheel 42.

Sealing

The adjustable chain guides 26 seen in Fig. 8 urge the chains into sufficiently tight engagement with the bags B so that until the bags have passed from the bite of chains, which will not be until after they have been filled, the chains will maintain control of them. By the time they are released by the chains, they will be between constantly driven belts 44. The belts 44 grip the bags rather loosely, at least initially, so as not to tear them while they are in the control of the chains 22. These belts are preferably vibrated by any suitable mechanism 97 so as to shake the lollipop to the bottom of the bag if it did not fall there initially. The belts carry the bags between guide plates 96 which guide the mouths of the bags between the heated rollers of "Doughboy" sealers 46. The bags then pass to the discharge end of the machine where they may be packaged in boxes, manually or automatically, or otherwise disposed of.

Other features and details

Wherever convenient, cam plates 99 (Fig. 1) operated by accessible levers 100 may be provided to be swung into position to push off all lollipops before they reach the filling position in case any trouble develops. These ejected lollipops fall into a suitable chute to slide out of the machine to a bin. Preferably there is room for a full bag set within length of guides 23 of Fig. 11. The air jets urging the bags against fingers 24 may comprise one or more pairs of jets on opposite sides of the bag sets to provide a balanced action. An upper guide 102 (Fig. 1) which may be adjustable preferably is provided to keep the bag set from being blown off the bottom slide.

The bag feeding chains 22 preferably have curved-faced links staggered so that they slightly crinkle the bottom of the bag set. The bag set is held more by this type of gripping than by a positive clamping, thus giving a resilient effect.

The chain 11 may be held up against sprocket 48 by a suitable idler sprocket or guide block spaced a little from the sprocket 48.

From the foregoing it is seen that packaging apparatus has been provided in which the output of a cooling conveyor is divided between two packaging units, one above the other, both of which can be attended by the same attendant and each of which automatically drops lollipops into successive bags and automatically holds up the movement of the bags when a lollipop is missing. Of course, other articles could be handled in a similar manner.

I claim:
1. The combination of a preliminary conveyor having succession of article-carrying pins and two receiving conveyors running adjacent to successive portions of the preliminary conveyor and having article-carrying pins on each, opposed to and at times approximately aligned with the pins on the preliminary conveyor, a rotating arm device operating in timed relation to the preliminary conveyor for pushing intermittent articles from the pins thereof to the pins of one of the receiving conveyors, and a stationary cam for pushing onto the pins of the other receiving conveyor the articles coming adjacent thereto on the preliminary conveyor.

2. The combination of a preliminary conveyor having a succession of article-carrying pins and two receiving conveyors running adjacent to successive portions of the preliminary conveyor and having article-carrying pins on each, opposed to and at times approximately aligned with the pins on the preliminary conveyor, a device operating in timed relation to the preliminary conveyor for pushing intermittent articles from the pins thereof to the pins of one of the receiving conveyors, and a stationary cam for pushing onto the pins of the other receiving conveyor the articles coming adjacent thereto on the preliminary conveyor.

3. Apparatus for filling bags including a conveyor for carrying articles at predetermined positions thereon, means for driving the article conveyor, a reciprocating pawl constantly driven by said driving means with a frequency corresponding to the frequency the article carrying positions of the conveyor pass a given point, a ratchet wheel engaged by said pawl and actuated by it with step-by-step movement, a bag conveyor driven by said ratchet wheel with corresponding step-by-step movement, means for releasing the articles from the article conveyor at a predetermined point, said conveyors being so disposed that the article then fills the bag, a detector for detecting the presence or absence of an article to be packaged when such article is due at a particular point, and means responsive to said detector if no article appears at said point when due for shifting the pawl so that it will not engage the ratchet wheel.

4. Apparatus for filling bags including a conveyor for carrying articles, means for driving the article conveyor, a reciprocating pawl constantly driven by said driving means, a ratchet wheel engaged by said pawl and actuated by it with step-by-step movement, a bag conveyor, means driven by said ratchet wheel for driving the bag conveyor with corresponding step-by-step movement, means for releasing the articles from the article conveyor at a predetermined point, said conveyors being so disposed that the article then fills the bag, means for adjusting the angularity between the first-named driving means and the pawl-operating means driven thereby for determining the timing of the movements of the bag conveyor, and means for adjusting the angularity between the ratchet wheel and the means for driving the bag conveyor for adjusting the positions at which the bag conveyor comes to rest.

5. Apparatus for packaging articles including conveyor means adapted to grasp bags adjacent the lower ends thereof, means adapted to feed bags to the conveyor means in a predetermined relationship thereto, a pin conveyor including endless means and pins carried thereby, means for hanging articles to be packaged on the pins of said conveyor, fixed pulleys for supporting and, during the period articles are hung on the pins, for moving a portion of the endless conveyor along a substantially straight line to position the ends of the pins successively approximately over the bags at a bag-filling position at a height to hold the articles entirely above the bags, means for causing relative withdrawal of the pin support from the articles at said position to drop the articles into the bags, detector means for determining the presence or absence of an article when it is due at a predetermined position, and means controlled by the detector means for controlling the feed of the bags to delay the feed of the bags when an article has been missed until the next article is supplied.

6. Apparatus for packaging articles including conveyor means adapted to grasp bags adjacent the lower ends thereof, means adapted to feed bags to the conveyor means in a predetermined relationship thereto, a pin conveyor including endless means and pins carried thereby, means for hanging articles to be packaged on the pins of said conveyor, fixed pulleys for supporting and, during the period articles are hung on the pins, for moving a portion of the endless conveyor along a substantially straight line to position the ends of the pins successively approximately over the bags at a bag filling position at a height to hold the articles entirely above the bags, and means for causing relative withdrawal of the pin support from the articles at said position to drop the articles into the bags.

7. Apparatus for packaging articles including conveyor means, means adapted to feed bags to the conveyor means in a predetermined relationship thereto, a pin conveyor including endless means and pins carried thereby, means for hanging articles to be packaged on the pins of said conveyor, fixed pulleys for supporting and, during the period articles are hung on the pins, for moving a portion of the endless conveyor along a substantially straight line to position the ends of the pins successively approximately over the bags at a bag-filling position at a height to hold the articles entirely above the bags, means for causing relative withdrawal of the pin support from the articles at said position to drop the articles into the bags, detector means for determining the presence or absence of an article when it is due at a predetermined position, and means controlled by the detector means for controlling the feed of the bags to delay the feed of the bags when an article has been missed until the next article is supplied.

8. Apparatus for packaging articles including conveyor means, means adapted to feed bags to the conveyor means in a predetermined relationship thereto, a pin conveyor including endless means and pins carried thereby, means for hanging articles to be packaged on the pins of said conveyor, fixed pulleys for supporting and, during the period articles are hung on the pins, for moving a portion of the endless conveyor along a substantially straight line to position the ends of the pins successively approximately over the bags at a bag-filling position at a height to hold the articles entirely above the bags, and means for causing relative withdrawal of the pin support from the articles at said position to drop the articles into the bags.

9. Apparatus for filling bags including a conveyor carrying spaced-apart articles, a bag conveyor, means for releasing the successive articles from the article conveyor at a predetermined point to drop them into open bags successively positioned to receive them, deactivating means for rendering the bag conveyor temporarily inoperative to feed the bags, and control means for the deactivating means including detector means comprising a source of light and a photocell for detecting the presence or absence of an article to be packaged when such article is due to be carried between said source and said photocell to block said light, blocking means adapted to prevent the said passage of light, and means for moving said blocking means in timed relationship with the movement of the spaced-apart articles to move the blocking means from its blocking position when an article is due to be carried between the source and the photocell and to move the blocking means into a blocking position and hold it there until the next article is due.

10. Apparatus for filling bags including a conveyor for carrying spaced-apart articles, a bag conveyor, means for releasing the articles from the article conveyor at a predetermined point to drop them into open bags positioned by the bag conveyor to receive them, detector means comprising a source of light and a photocell for detecting the presence or absence of an article to be packaged when such article is due to be carried between said source and said photocell to block the light, blocking means adapted to prevent the said passage of light, means for moving said blocking means in timed relationship with the movement of the spaced-apart articles to move the blocking means from its blocking position when an article is due to be carried between the source and the photocell and to move the blocking means into a blocking position and hold it there until the next article is due, and deactivating means responsive to the detector means when the absence of an article is detected for rendering the bag conveyor temporarily inoperative to feed the bags.

CARL W. SPOHR.

References Cited in the file of this patent

UNITED STATES PATENTS

| Number | Name | Date |
| --- | --- | --- |
| 1,312,640 | Mallinckrodt | Aug. 12, 1919 |
| 1,437,410 | Evans et al. | Dec. 5, 1922 |
| 1,548,102 | Sherman | Aug. 4, 1925 |
| 2,095,938 | Schmitt | Oct. 12, 1937 |
| 2,107,926 | Asmussen | Feb. 8, 1938 |
| 2,119,767 | Anderson | June 7, 1938 |
| 2,120,052 | Bishop | June 7, 1938 |
| 2,247,695 | Papendick | July 1, 1941 |
| 2,319,167 | Stewart | May 11, 1943 |
| 2,323,537 | Harber | July 6, 1943 |
| 2,333,571 | Hohl et al. | Nov. 2, 1943 |
| 2,335,790 | Ransburg | Nov. 30, 1943 |
| 2,337,526 | Stedaman et al. | Dec. 21, 1943 |
| 2,361,588 | Ayers | Oct. 31, 1944 |
| 2,396,706 | Kott | Mar. 19, 1946 |

FOREIGN PATENTS

| Number | Country | Date |
| --- | --- | --- |
| 513,764 | Great Britain | Oct. 20, 1939 |